US010284741B2

(12) United States Patent
Hachisuga et al.

(10) Patent No.: US 10,284,741 B2
(45) Date of Patent: May 7, 2019

(54) IMAGE READING OPTICAL SYSTEM WITH AN ADJUSTMENT MIRROR

(71) Applicant: FUJI XEROX CO., LTD., Tokyo (JP)

(72) Inventors: Masaki Hachisuga, Kanagawa (JP); Kiyofumi Aikawa, Kanagawa (JP); Takashi Hiramatsu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/215,045

(22) Filed: Jul. 20, 2016

(65) Prior Publication Data
US 2017/0279999 A1 Sep. 28, 2017

(30) Foreign Application Priority Data

Mar. 25, 2016 (JP) ................................. 2016-062375

(51) Int. Cl.
H04N 1/028 (2006.01)
H04N 1/00 (2006.01)
(52) U.S. Cl.
CPC ..... *H04N 1/02895* (2013.01); *H04N 1/00602* (2013.01); *H04N 1/00795* (2013.01); *H04N 2201/0081* (2013.01)
(58) Field of Classification Search
None
See application file for complete search history.

(56) References Cited

U.S. PATENT DOCUMENTS

| 5,831,758 | A | * | 11/1998 | Sakai | G02B 26/123 |
| | | | | | 359/204.1 |
| 6,198,563 | B1 | * | 3/2001 | Atsuumi | B41J 2/471 |
| | | | | | 347/256 |
| 6,611,292 | B1 | * | 8/2003 | Tsai | H04N 1/00013 |
| | | | | | 348/345 |
| 2003/0234966 | A1 | | 12/2003 | Tochigi et al. | |
| 2004/0218032 | A1 | * | 11/2004 | Yamaguchi | G02B 26/124 |
| | | | | | 347/258 |
| 2007/0013766 | A1 | * | 1/2007 | Kim | H04N 1/03 |
| | | | | | 347/241 |
| 2007/0229779 | A1 | * | 10/2007 | Kuwata | G02B 13/16 |
| | | | | | 353/99 |
| 2008/0285045 | A1 | * | 11/2008 | Gabolde | G01J 11/00 |
| | | | | | 356/457 |
| 2010/0020367 | A1 | * | 1/2010 | Abe | G02B 17/08 |
| | | | | | 358/474 |

FOREIGN PATENT DOCUMENTS

JP 2003-344956 A 12/2003
JP 2005-084624 A 3/2005

\* cited by examiner

Primary Examiner — Marcellus Augustin
(74) Attorney, Agent, or Firm — Oliff PLC

(57) ABSTRACT

Provided is an image reading optical system including an image reading unit in which plural reading devices are arranged in a first direction, and plural image-forming mirrors that guide reflected light, which is acquired by reflecting light from a light source in a reading target, to the image reading unit, wherein any one of the plural image-forming mirrors is an adjustment mirror that has power only in one of the first direction and a second direction intersecting the first direction, and is rotatable or relatively movable with respect to the other image-forming mirrors.

5 Claims, 18 Drawing Sheets

FOCUS VARIATION
($\Delta f = 15$mm)

LONGITUDINAL DIRECTION (mm)

— FOCUSING POSITION (LONGITUDINAL)
--- FOCUSING POSITION (LATERAL)

ALIGNMENT VARIATION
($\Delta f = 15$mm)

LONGITUDINAL DIRECTION (mm)

— LINEARITY (LONGITUDINAL)
--- LINEARITY (LATERAL)

FOCUS VARIATION
(Δf = 15mm)

LONGITUDINAL DIRECTION (mm)

— FOCUSING POSITION (LONGITUDINAL)
--- FOCUSING POSITION (LATERAL)

ALIGNMENT VARIATION
(Δf = 15mm)

LONGITUDINAL DIRECTION (mm)

— LINEARITY (LONGITUDINAL)
--- LINEARITY (LATERAL)

FOCUS VARIATION
(Δf = 15mm)

LONGITUDINAL DIRECTION (mm)

— FOCUSING POSITION (LONGITUDINAL)
--- FOCUSING POSITION (LATERAL)

ALIGNMENT VARIATION
(Δf = 15mm)

LONGITUDINAL DIRECTION (mm)

— LINEARITY (LONGITUDINAL)
--- LINEARITY (LATERAL)

FOCUS VARIATION
(Δf = 15mm)

LONGITUDINAL DIRECTION (mm)

— FOCUSING POSITION (LONGITUDINAL)
--- FOCUSING POSITION (LATERAL)

ALIGNMENT VARIATION
(Δf = 15mm)

LONGITUDINAL DIRECTION (mm)

— LINEARITY (LONGITUDINAL)
--- LINEARITY (LATERAL)

FOCUS VARIATION
(Δf = 15mm)

LONGITUDINAL DIRECTION (mm)

— FOCUSING POSITION (LONGITUDINAL)
--- FOCUSING POSITION (LATERAL)

ALIGNMENT VARIATION
(Δf = 15mm)

LONGITUDINAL DIRECTION (mm)

— LINEARITY (LONGITUDINAL)
--- LINEARITY (LATERAL)

FOCUS VARIATION
(Δf = 15mm)

LONGITUDINAL DIRECTION (mm)

— FOCUSING POSITION (LONGITUDINAL)
--- FOCUSING POSITION (LATERAL)

ALIGNMENT VARIATION
(Δf = 15mm)

LONGITUDINAL DIRECTION (mm)

— LINEARITY (LONGITUDINAL)
--- LINEARITY (LATERAL)

FOCUS VARIATION
(Δf = 15mm)

LONGITUDINAL DIRECTION (mm)

— FOCUSING POSITION (LONGITUDINAL)
--- FOCUSING POSITION (LATERAL)

ALIGNMENT VARIATION
(Δf = 15mm)

LONGITUDINAL DIRECTION (mm)

— LINEARITY (LONGITUDINAL)
--- LINEARITY (LATERAL)

FOCUS VARIATION
($\Delta f$ = 15mm)

LONGITUDINAL DIRECTION (mm)

— FOCUSING POSITION (LONGITUDINAL)
--- FOCUSING POSITION (LATERAL)

ALIGNMENT VARIATION
($\Delta f$ = 15mm)

LONGITUDINAL DIRECTION (mm)

— LINEARITY (LONGITUDINAL)
--- LINEARITY (LATERAL)

FOCUS VARIATION
(Δf = 15mm)

LONGITUDINAL DIRECTION (mm)

— FOCUSING POSITION (LONGITUDINAL)
--- FOCUSING POSITION (LATERAL)

ALIGNMENT VARIATION
(Δf = 15mm)

LONGITUDINAL DIRECTION (mm)

— LINEARITY (LONGITUDINAL)
--- LINEARITY (LATERAL)

FOCUS VARIATION
($\Delta f$ = 15mm)

LONGITUDINAL DIRECTION (mm)

— FOCUSING POSITION (LONGITUDINAL)
--- FOCUSING POSITION (LATERAL)

ALIGNMENT VARIATION
($\Delta f$ = 15mm)

LONGITUDINAL DIRECTION (mm)

— LINEARITY (LONGITUDINAL)
--- LINEARITY (LATERAL)

FOCUS VARIATION
($\Delta f = 15mm$)

LONGITUDINAL DIRECTION (mm)

— FOCUSING POSITION (LONGITUDINAL)
--- FOCUSING POSITION (LATERAL)

ALIGNMENT VARIATION
($\Delta f = 15mm$)

LONGITUDINAL DIRECTION (mm)

— LINEARITY (LONGITUDINAL)
--- LINEARITY (LATERAL)

FOCUS VARIATION
(Δf = 15mm)

— FOCUSING POSITION (LONGITUDINAL)   --- FOCUSING POSITION (LATERAL)

ALIGNMENT VARIATION
(Δf = 15mm)

— LINEARITY (LONGITUDINAL)   --- LINEARITY (LATERAL)

IMAGE READING OPTICAL SYSTEM WITH AN ADJUSTMENT MIRROR

CROSS-REFERENCE TO RELATED APPLICATIONS

This application is based on and claims priority under 35 USC 119 from Japanese Patent Application No. 2016-062375 filed Mar. 25, 2016.

BACKGROUND

Technical Field

The present invention relates to an image reading optical system and an image reading apparatus.

SUMMARY

According to an aspect of the invention, there is provided an image reading optical system including:

an image reading unit in which plural reading devices are arranged in a first direction; and plural image-forming mirrors that guide reflected light, which is acquired by reflecting light from a light source in a reading target, to the image reading unit, wherein any one of the plural image-forming mirrors is an adjustment mirror that has power only in one of the first direction and a second direction intersecting the first direction, and is rotatable or relatively movable with respect to the other image-forming mirrors.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described in detail with reference to the accompanying drawings.

[First Exemplary Embodiment]

Figure 1:
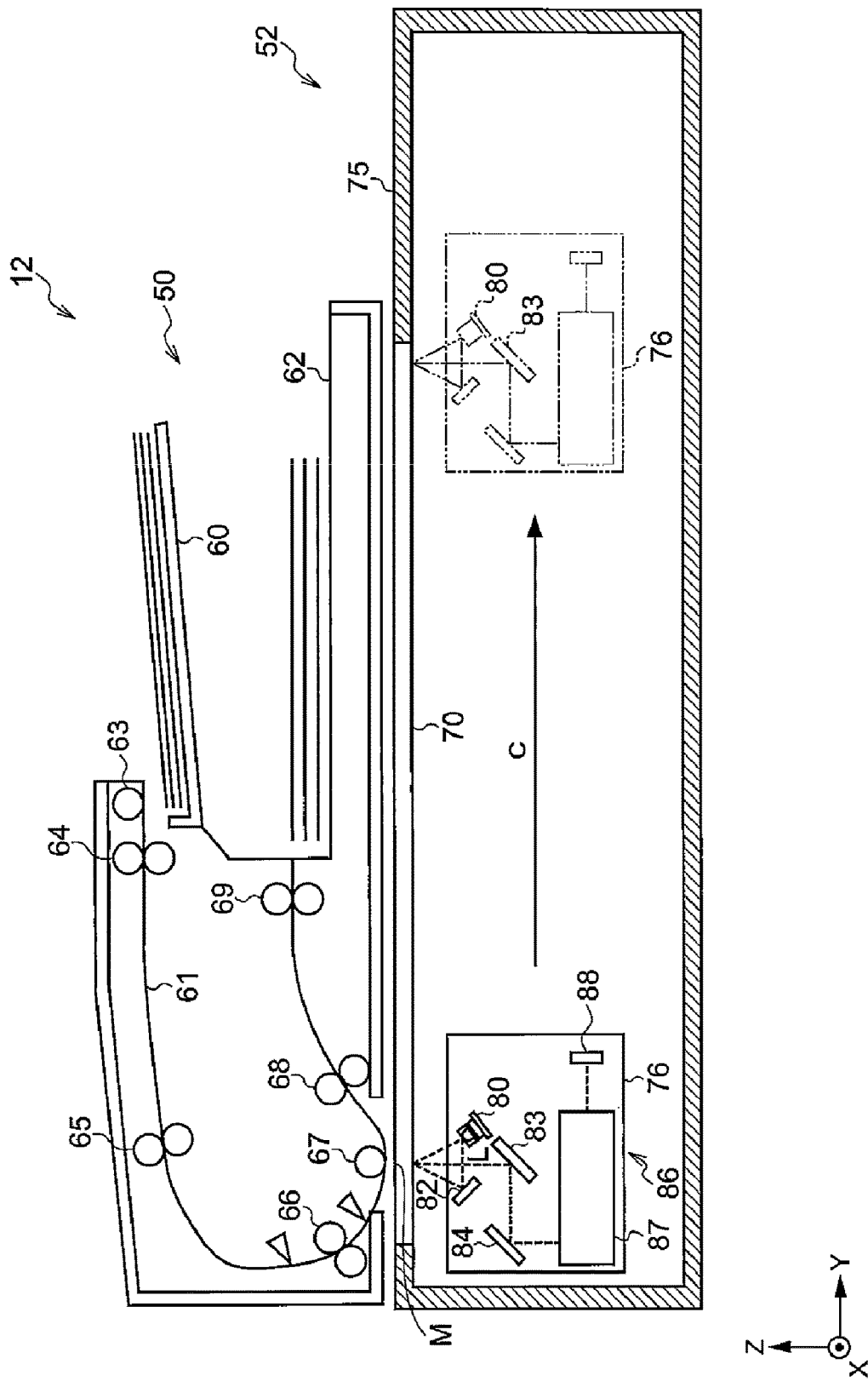
FIG. 1 is a schematic sectional view illustrating an example of the configuration of an image reading apparatus according to exemplary embodiments.
Figure 2A:
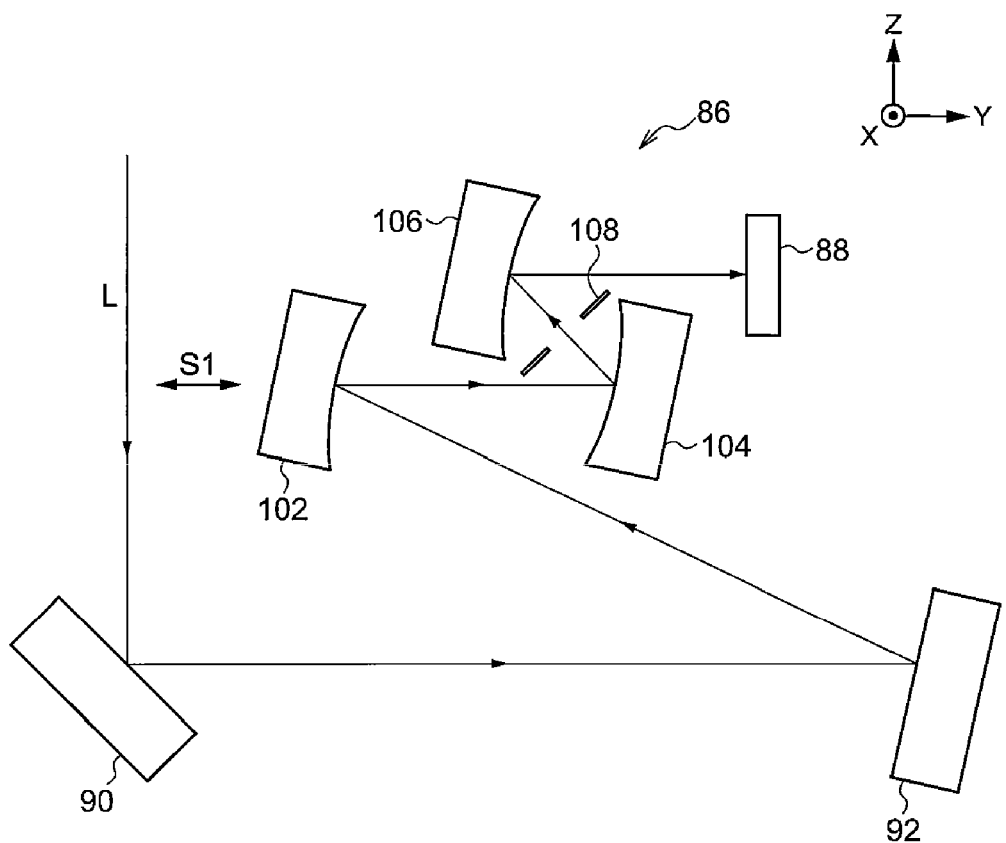
FIGS. 2A and 2B are a side view and a plan view illustrating an example of the configuration of an image reading optical system according to a first exemplary embodiment.
Figure 2B:
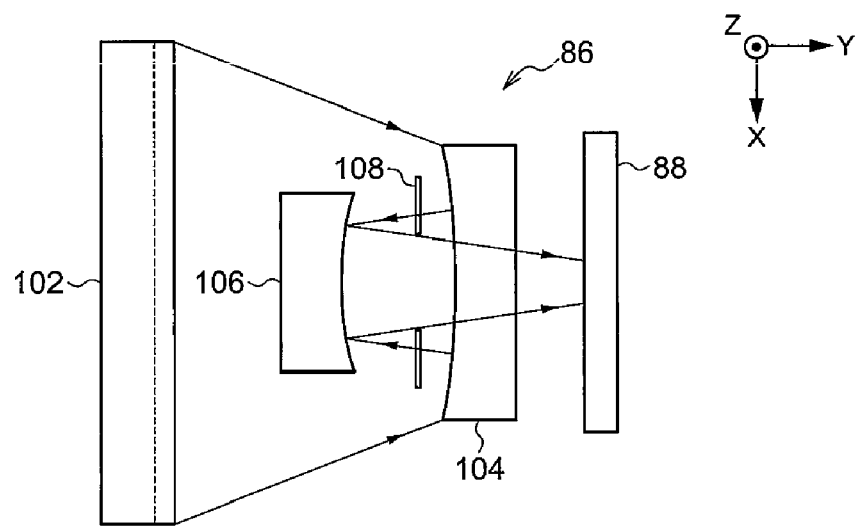

An image reading apparatus and an image reading optical system according to a first exemplary embodiment will be described with reference to FIGS. 1 to 4B. FIG. 1 illustrates the schematic configuration of an image reading apparatus 12 according to the exemplary embodiment, and FIGS. 2A and 2B illustrate the schematic configuration of an image reading optical system 86 according to the exemplary embodiment. The image reading apparatus 12 is provided to be attached to, for example, an image forming apparatus, and is used to read an original document (reading target) or the like.

As illustrated in FIG. 1, the image reading apparatus 12 includes an automatic document feeder 50, and an image read processing portion 52 that reads an image which is formed on the surface of an original document.

The automatic document feeder 50 according to the exemplary embodiment includes a document stand 60 on which the original document is placed, a document transporting path 61 that transports the original document, and an output stand 62 that discharges the original document after an image is read.

The document transporting path 61 is formed in a U-shape. A paper delivery roller 63, a delivery roller 64, a pre-registration roller 65, a registration roller 66, a platen roller 67, an out roller 68, and an exit roller 69 are provided around the document transporting path 61. The paper delivery roller 63 drops in a case in which original documents are fed, and picks up the original documents which are placed on the document stand 60. The delivery roller 64 supplies an original document, which is placed at the top of the original documents which are fed from the paper delivery roller 63, to inside. The pre-registration roller 65 temporarily stops the original document which is fed from the delivery roller 64, and performs skew correction. The registration roller 66 temporarily stops the original document which is fed from the pre-registration roller 65, and adjusts a read timing. The platen roller 67 causes the original document, which passes through the document transporting path 61, to confront with a platen glass 70 which will be described later. The out roller 68 and the exit roller 69 discharge the read original document to the output stand 62.

The image reading apparatus 12 has a function of skimming the surface of the original document which is fed from the document stand 60 by the automatic document feeder 50, and a function of reading the surface of the original document which is placed on the platen glass 70 which will be described later.

The platen glass 70, which is an opening portion for irradiating an original document with light in a case in which the original document, from which an image is read, is placed or the original document, which is being transported by the automatic document feeder 50 is read, is provided on a surface of the image read processing portion 52 which faces the automatic document feeder 50 in a housing 75. In addition, the housing 75 is provided with a reading unit (carriage) 76 that is enabled to move in a document transporting direction (+Y direction of FIG. 1), and is configured to read an image after being stopped at a reading position M of the platen glass 70 or read an image while scanning over the whole platen glass 70.

The reading unit 76 includes a lighting unit 80 (light source), an image forming portion 87, and a sensor 88 (image reading unit). The image reading optical system 86 according to the exemplary embodiment is formed with the image forming portion 87 and the sensor 88.

As an example, the lighting unit 80 is formed by arranging plural white light emitting diodes (LEDs) as light sources. A diffuse-reflective member 82 is a member that reflects light emitted from the lighting unit 80 while causing the light to be diffused toward an original-document surface. A mirror 83 and a mirror 84 are members that guide reflected light L, which is acquired from the original-document surface, to the image reading optical system 86.

The image forming portion 87 has a function of adjusting light flux (optical image) of the reflected light L acquired from the original-document surface into a shape which is suitable for light reception by the sensor 88. There is a case in which the image forming portion 87 includes an image-forming lens (not illustrated in the drawing) that optically reduces the optical image which is acquired from the original-document surface. The image forming portion 87 will be described in detail later.

The sensor 88 has a function of performing photoelectric conversion on the optical image which is acquired by the image forming portion 87 and generating red (R), green (G), and blue (B) color signals (image signals), respectively. The sensor 88 has, for example, a configuration in which one-dimensional line sensors, which extend in the X-axial direction for the respective R, G, and B colors, are arranged in three columns in the Z-axial direction, and a CCD image sensor is used as an example. In other words, the sensor 88 is formed in such a way that image capturing devices (reading devices) are arranged in the X-axial direction. Meanwhile, hereinafter, there are cases in which a "longitudinal direction" denotes a direction (X-axial direction) in which the image capturing devices of the sensor 88 are arranged, and a "lateral direction" denotes a direction (Z-axial direction) which is perpendicular to (crosses) the direction in which the image capturing devices are arranged.

Subsequently, a procedure of reading an image in the image reading apparatus 12 according to the exemplary embodiment will be described.

In a case in which the original document that is placed on the platen glass 70 is read in the image reading apparatus 12, a control portion which is not illustrated in the drawing moves the reading unit 76 in the scanning direction (a direction of arrow C of FIG. 1). In addition, the control portion causes the lighting unit 80 of the reading unit 76 to emit light and causes the original-document surface to be irradiated. As a result of the irradiation, the reflected light L from the original document is guided to the image reading optical system 86 through the mirror 83 and the mirror 84. The light which is guided to the image reading optical system 86 forms an image on the light reception surface of the sensor 88. The sensor 88 reads almost simultaneously one line for each of the R, G, and B colors. Furthermore, the original document corresponding to one page is read by performing reading in the line direction through scanning over the whole original-document area.

In contrast, in a case in which the original document that is placed on the document stand 60 is read in the image reading apparatus 12, the control portion which is not illustrated in the drawing transports the original document that is placed on the document stand 60 to the reading position M of the platen glass 70 along the document transporting path 61. At this time, the reading unit 76 is positioned in a state of being stopped at a position expressed by a solid line of FIG. 1. In addition, the control portion causes the lighting unit 80 to emit light, and causes the original-document surface to be irradiated. Therefore, the reflected light L of the original document, which adheres to the platen glass 70 by the platen roller 67, is guided to the image reading optical system 86 through the mirror 83 and the mirror 84. The light which is guided to the image reading optical system 86 forms an image on the light reception surface of the sensor 88. The sensor 88 almost simultaneously reads one line for each of the R, G, and B. Furthermore, the original document corresponding to one page is read by passing the entire original document through the reading position M of the platen glass 70.

However, there is a case in which an image reading optical system, in which plural image-forming mirrors having power (strength which causes light to curve) are combined in a predetermined direction, is used as an optical system for adjusting the reflected light L acquired from the original-document surface into a shape which is suitable for light reception by the sensor. In addition, there are many cases in which the image reading optical system, in which the plural image-forming mirrors are combined, are formed as a non-coaxial optical system.

In the image reading optical system in which the non-coaxial optical system using the plural image-forming mirrors is used as described above, the power in the longitudinal direction is different from the power in the lateral direction in each of the image-forming mirrors, with the result that precision errors are easily generated when each of the image-forming mirrors is formed for a rotational symmetric shape, and thus there is a case in which focusing positions are deviated in the longitudinal direction and the lateral direction. Therefore, in the related art, an adjustment mechanism is provided in each of the image-forming mirrors.

However, in the image reading optical system according to the related art, if the image-forming mirrors are adjusted by the adjustment mechanism so that a specific index is close to a target value, other indexes (alignments or the like which will be described later) are changed, and thus there is a case in which it is necessary to adjust other image-forming mirrors. In such a case, it takes a long time for the adjustments converge, or there may be a case in which it is impossible to converge to the target value as a result.

The image reading optical system according to the related art will be described in more detail with reference to FIGS.

Figure 11A:
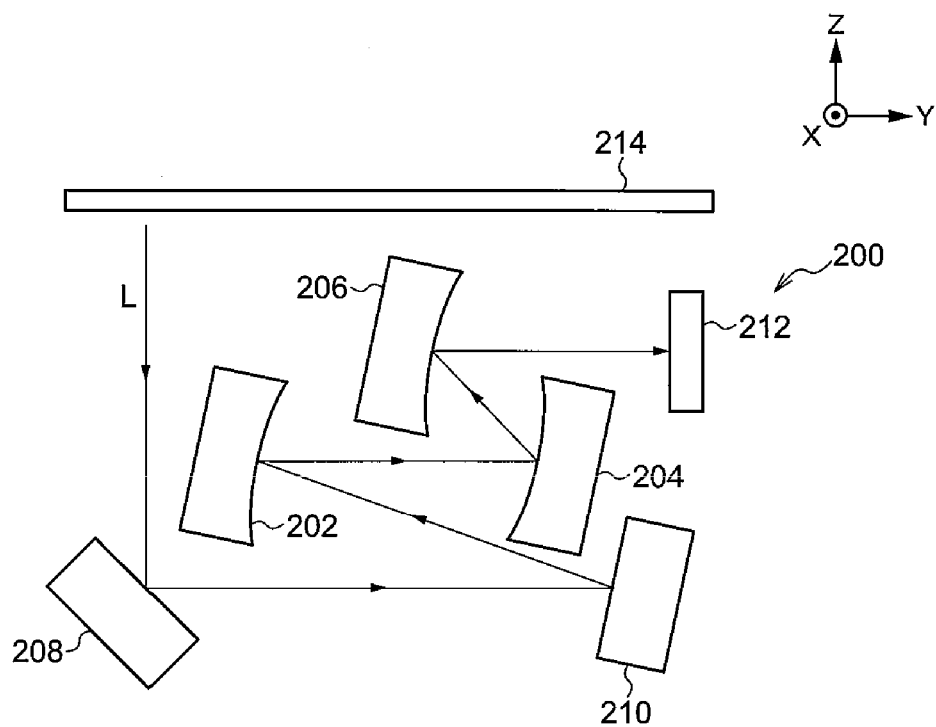
FIGS. 11A and 11B are a side view and a plan view illustrating an example of the configuration of the image reading optical system according to the related art.
Figure 11B:
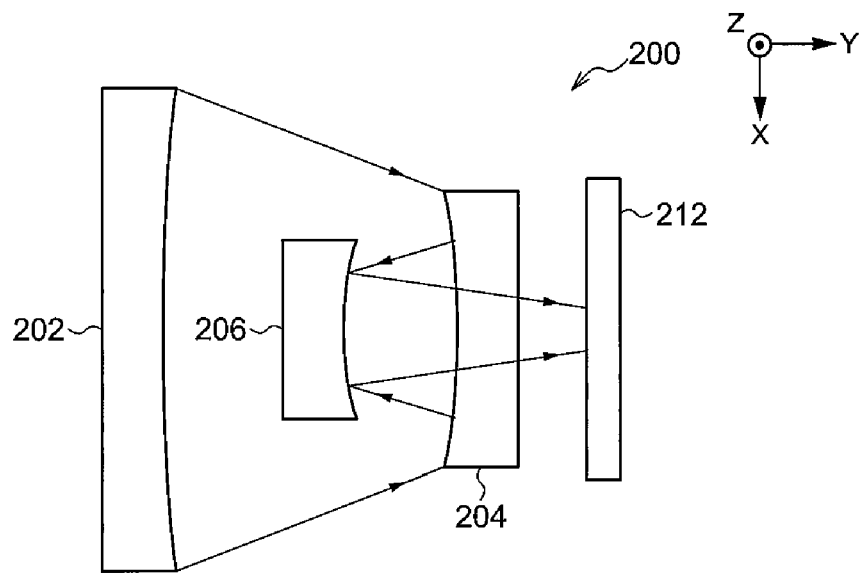
Figure 12A:
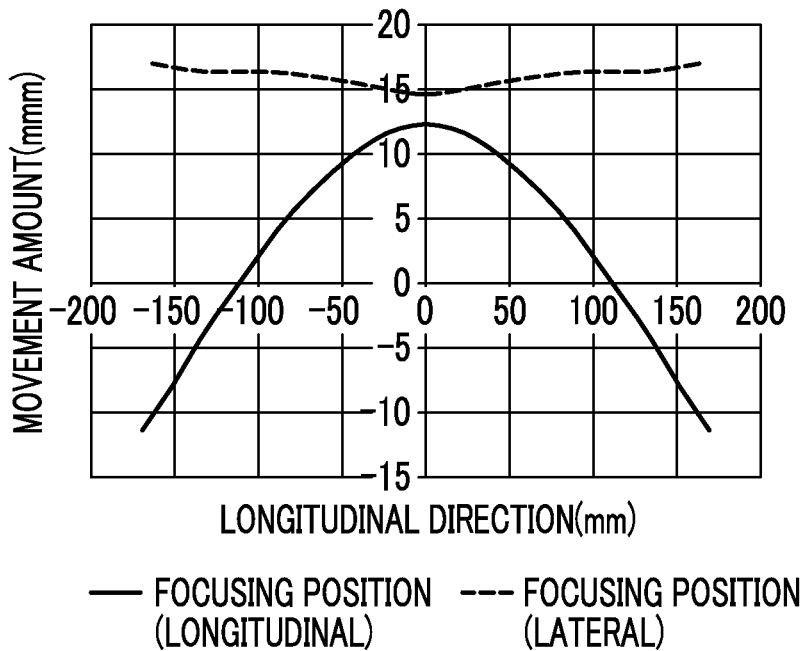
FIGS. 12A and 12B are graphs illustrating the adjustment characteristics in a case in which the focusing position of the image reading optical system according to the related art is adjusted.
Figure 12B:
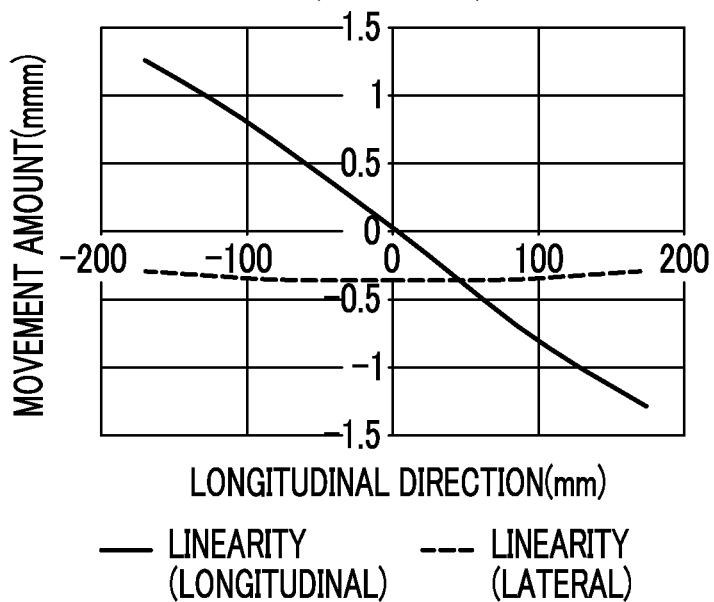

11A and 11B and FIGS. 12A and 12B. FIGS. 11A and 11B are views illustrating an image reading optical system 200 according to the related art, and FIGS. 12A and 12B are graphs illustrating the adjustment characteristics of the focusing positions of the image reading optical system 200.

As illustrated in FIGS. 11A and 11B, the image reading optical system 200 includes mirrors 208 and 210, image-forming mirrors 202, 204, and 206, and a sensor 212. Furthermore, the reflected light L, which has been reflected in an original-document surface 214, is reflected in the mirrors 208 and 210, and the image-forming mirrors 202, 204, and 206, respectively, and reaches the sensor 212. Each of the image-forming mirrors has power in the longitudinal direction and the lateral direction, and is provided with an adjustment mechanism for adjusting each of the focusing positions.

FIGS. 12A and 12B illustrate adjustment characteristics in a case in which the focusing positions are adjusted in the image reading optical system 200 according to the related art as illustrated in FIGS. 11A and 11B. FIG. 12A is a graph respectively illustrating the relationship between the movement amount of a focusing position in the longitudinal direction (X-axial direction) and a position in the longitudinal direction and the relationship between the movement amount of a focusing position in the lateral direction (Z-axial direction) and a position in the longitudinal direction in a case in which the focus of the image-forming mirror 202 in the lateral direction is moved from an initial position on the optical path by a movement amount Δf of 15 mm. Meanwhile, hereinafter, the focus of the image-forming mirror in the longitudinal direction is referred to as a "longitudinal focus" and the focus in the lateral direction is referred to as a "lateral focus".

In addition, FIG. 12B is a graph respectively illustrating the relationship between the alignment variation in the longitudinal direction and the position in the longitudinal direction and the relationship between the alignment variation in the lateral direction and the position in the longitudinal direction in a case in which the lateral focus of the image-forming mirror 202 is moved from the initial position on the optical path by a movement amount Δf of 15 mm. The "alignment" which is referred to in the exemplary embodiment means the error or the positional error of the length of an original document, which is recognized by the image reading optical system, for the length of an actual original document. The alignment which is acquired by plotting the alignment in the specific direction as illustrated in FIG. 12B means "linearity" (magnification). Meanwhile, hereinafter, the linearity in the longitudinal direction is referred to as "longitudinal linearity", and the linearity in the lateral direction is referred to as "lateral linearity". In addition, the entire deviation in the lateral direction is referred to as the deviation of lead registration.

As illustrated in FIG. 12A, in a case in which Δf is set to 15 mm, the movement amount of the lateral focus is almost constant, that is, approximately 15 mm. In contrast, the movement amount of the longitudinal focus varies in a range which is ±10 mm or wider. In addition, as illustrated in FIG. 12B, the movement amount of the lateral linearity is almost constant, that is, approximately 0.4 mm. In contrast, the movement amount of the longitudinal linearity varies in a range which is ±1 mm or wider. As described above, in the image reading optical system according to the related art, if the lateral focus of the specific image-forming mirror is changed, the longitudinal focus greatly moves at the same time. That is, the focus considerably changes for the longitudinal position and the longitudinal linearity considerably moves. In this case, it is necessary to further adjust the image-forming mirrors other than the image-forming mirror in which the lateral focus is changed, and, as a result, much time is required to adjust the focusing position. Further, it is conceivable that adjustment does not converge in a predetermined permission range.

Here, in the exemplary embodiment, an adjustment mirror, which has power only in a predetermined direction is provided, and the focusing positions in the longitudinal direction and the lateral direction are matched by only the adjustment mirror. Therefore, it is possible to suppress influence on other indexes even though the adjustment mirror is moved, and thus it is possible to provide the image reading optical system and the image reading apparatus in which the focusing positions are further simply adjusted.

Subsequently, the image reading optical system 86 according to the exemplary embodiment will be described with reference to FIGS. 2A to 4B. Although the image reading optical systems illustrated in FIGS. 2A to 4B are basically the same, image-forming mirrors (hereinafter, referred to as the "adjustment mirrors") for performing adjustment or adjusting units which will be described later are different.

FIG. 2A illustrates a side view of the image reading optical system 86, and FIG. 2B illustrates a plan view of the image reading optical system 86, respectively. However, in FIG. 2B, mirrors 90 and 92 illustrated in FIG. 2A are omitted. As illustrated in FIGS. 2A and 2B, the image reading optical system 86 includes the mirrors 90 and 92, image-forming mirrors 102, 104, and 106, a diaphragm 108, and the sensor 88.

The mirrors 90 and 92 are parts that guide the reflected light L which is reflected in the mirror 84 (refer to FIG. 1) to the subsequent following image-forming mirrors and planar mirrors are used in the exemplary embodiment.

The image-forming mirrors 102, 104, and 106 have power in predetermined directions, and have functions of shaping the light flux of the reflected light L into a shape which is suitable for light reception by the sensor 88, together with the diaphragm 108. The image-forming mirrors 102, 104, and 106 may have power in only one of the longitudinal direction and the lateral direction or may have power in both of the directions. However, at least one of the image-forming mirrors has power in any one of the longitudinal direction and the lateral direction. Here, in the exemplary embodiment, a form in which each of the image-forming mirrors 102, 104, and 106 has power in a predetermined direction is described as an example. However, the exemplary embodiment is not limited thereto, and planar mirrors may be used except for the adjustment mirror. In addition, a form may be provided in which the image-forming mirrors and the planar mirrors are included on the optical path of the reflected light L illustrated in FIG. 2A.

The adjustment methods of the image reading optical system 86 are classified according to which image-forming mirror is selected as the adjustment mirror or which one of the adjustment mirror and the adjusting unit is used. Each of the adjustment methods of the image reading optical system 86 will be described in more detail below.

<Adjustment Method in Which Image-Forming Mirror on Original-Document Side is Used as Adjustment Mirror>

FIGS. 2A and 2B illustrate an adjustment method in which the image-forming mirror 102 (the image-forming mirror which is near to the original-document side) is used as the adjustment mirror, and the positions of the longitudinal focus and the lateral focus are adjusted by the image-forming mirror 102. Therefore, only the lateral direction is set to the direction of the power of the image-forming mirror 102, and the image-forming mirror 102 is enabled to move along a movement direction S1 (direction of the reflected light of the image-forming mirror 102) illustrated in FIG. 2A.

In the exemplary embodiment, since the sensor 88 is a one-dimensional line sensor which extends in the X-axial direction, the angle of view (viewing angle) in the longitudinal direction is large and the angle of view (viewing angle) in the lateral direction is small. Therefore, if the direction of the power of the adjustment mirror (the image-forming mirror 102) is set to only the lateral direction, it is possible to adjust the focusing position while suppressing the variation in the focusing position in the longitudinal direction. In addition, if the image-forming mirror 102, which is near to the original-document side, is set to the adjustment mirror, sensitivity which is acquired in a case in which the adjustment mirror is moved is dulled. If the sensitivity of adjustment is dulled, there is an advantage in that resisting force against variation in the position of the adjustment mirror is high after the adjustment is performed. Meanwhile, in the exemplary embodiment, a case in which the direction of the power of the adjustment mirror is set to only the lateral direction has been described as an example. However, it is apparent that the direction of the power of the adjustment mirror may be set to only the longitudinal direction.

<Adjustment Method in Which Image-Forming Mirror on Sensor Side is Set to Adjustment Mirror>

Figure 3A:
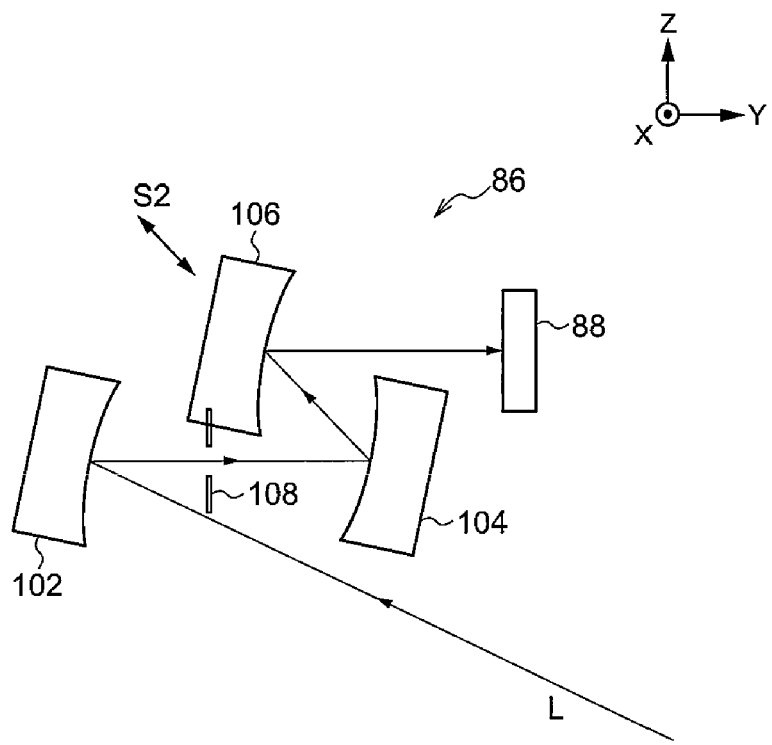
FIGS. 3A and 3B are a side view and a plan view illustrating an example of the configuration of the image reading optical system according to the first exemplary embodiment.
Figure 3B:
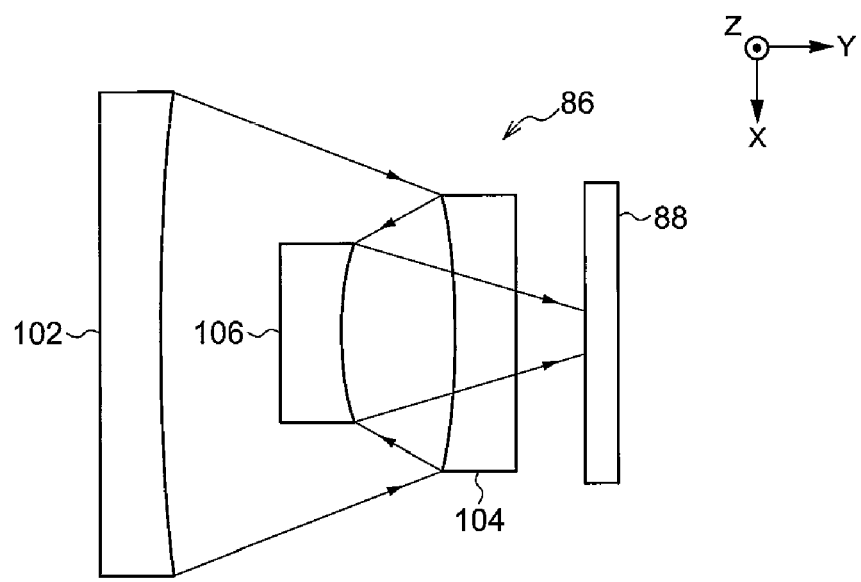

FIGS. 3A and 3B illustrate an adjustment method in which the image-forming mirror 106 (the image-forming mirror which is near to the sensor side) is set to the adjustment mirror, and the positions of the longitudinal focus and the lateral focus are adjusted by the image-forming mirror 106. Therefore, the direction of the power of the image-forming mirror 106 is set to only the lateral direction, and the image-forming mirror 106 is enabled to move along a movement direction S2 (the direction of light which is incident into the image-forming mirror 106) illustrated in FIG. 3A.

If the image-forming mirror on the sensor side is set to the adjustment mirror, the image-forming mirror, which is arranged in a position in which light flux of the reflected light L is reduced, is adjusted. Therefore, adjustment is performed by a small image-forming mirror compared to a case in which the image-forming mirror on the original-document side is adjusted, and thus there is an advantage in that it is easy to perform adjustment. Meanwhile, in the exemplary embodiment, a case in which the direction of the power of the adjustment mirror is set to only the lateral direction has been described as an example. However, it is apparent that the direction of the power of the adjustment mirror may be set to only the longitudinal direction.

<Adjustment Method in Which Movement Unit is Set to Adjusting Unit>

Figure 4A:
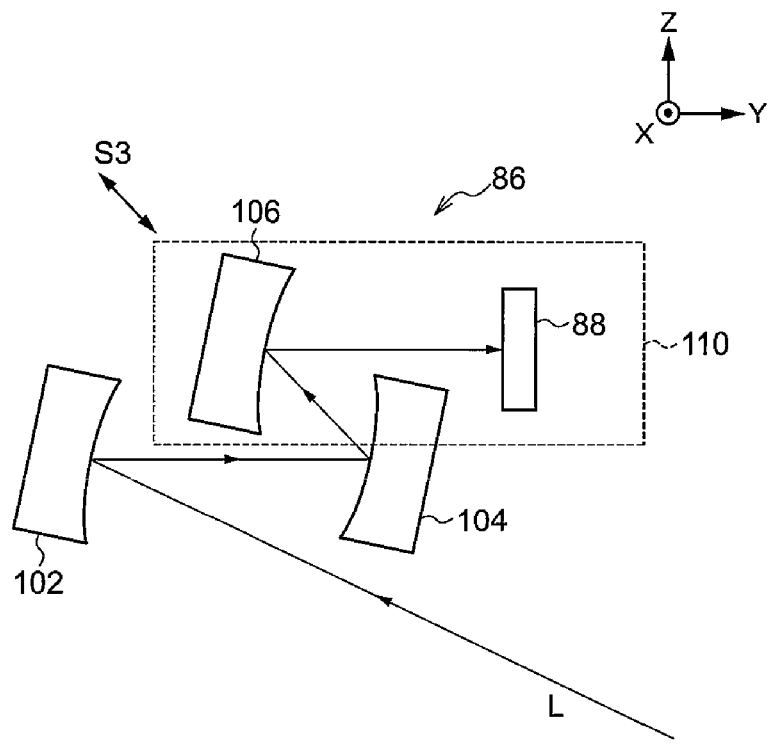
FIGS. 4A and 4B are a side view and a plan view illustrating an example of the configuration of the image reading optical system according to the first exemplary embodiment.
Figure 4B:
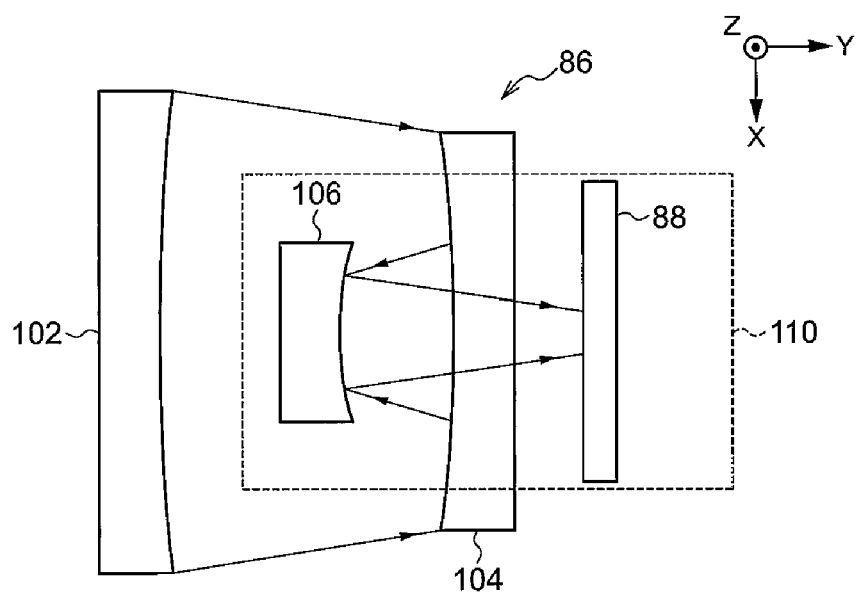

FIGS. 4A and 4B illustrate an adjustment method in which adjustment is performed by moving an adjusting unit which is enabled to move by integrating the image-forming mirror with the sensor. That is, as illustrated in FIGS. 4A and 4B, in the exemplary embodiment, the image-forming mirror 106 and the sensor 88 are integrated as a movement unit 110, and are capable of moving along a movement direction S3 (the direction of light which is incident into the image-forming mirror 106) together. In the exemplary embodiment, a case in which the image-forming mirror 106 has power only in the lateral direction has been described. However, it is apparent that the direction of the power of the image-forming mirror 106 may be set to only the longitudinal direction. As will be described later, if the movement unit is used, there is an advantage in that the accuracy of the adjustment of the focusing position is high.

Meanwhile, as the adjustment method in which the movement unit is used, there is an adjustment method in which the movement unit is formed by integrating the image-forming mirror on the original-document side with another mirror as will be described later, in addition to the adjustment method in which the movement unit is formed by integrating the image-forming mirror on the sensor side with the sensor. In addition, as will be described later, there is an adjustment method using a rotation unit, which is formed by integrating the image-forming mirror with another optical device and is rotated around the center of the image-forming mirror acquired as an axis, in addition to the movement unit.

[Second Exemplary Embodiment]

An image reading optical system 86a according to a second exemplary embodiment will be described with reference to FIG. 5. In the exemplary embodiment, in addition to the adjustment of the focusing positions performed by the above-described image-forming mirrors, adjustment of the position of a lead registration is performed by a planar mirror.

Figure 5:
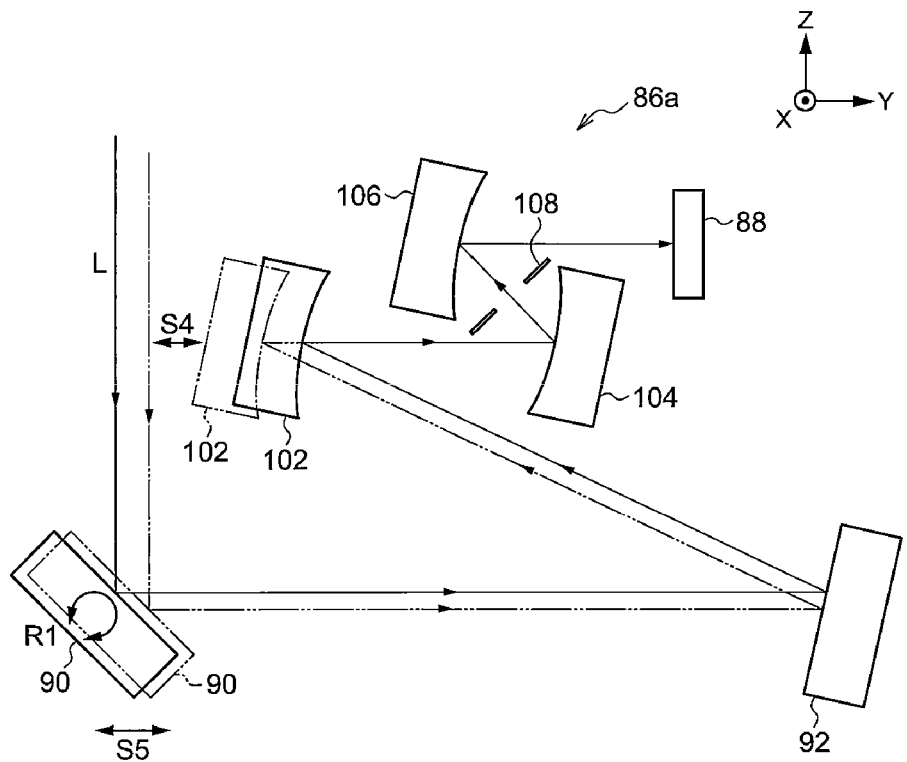
FIG. 5 is a side view illustrating an example of the configuration of an image reading optical system according to a second exemplary embodiment.

As illustrated in FIG. 5, the configuration of the mirrors of the image reading optical system 86a is the same as that of the image reading optical system 86 illustrated in FIGS. 2A and 2B while including the fact that the image-forming mirror 102 is set to the adjustment mirror which is enabled to move along a movement direction S4. However, the image reading optical system 86a is configured such that the mirror 90 is enabled to at least move or rotate. The image reading optical system 86a is configured such that the adjustment of the position of the lead registration is performed by the mirror 90 in addition to the adjustment of the focusing position performed by the image-forming mirror 102.

The lead registration is a head position of a region in which the read image is arranged. In a case in which the focusing position is adjusted by the image-forming mirror which is the adjustment mirror, the position of the lead registration is not necessarily an optimal position. Here, the image reading optical system 86a is configured such that the mirror 90 which is the planar mirror is enabled to move along a movement direction S5, is enabled to rotate along a rotation direction R1 in which the axis of the X-axial direction is set to a rotational axis, and the position of the lead registration is adjusted as much as the deviation due to the adjustment mirror. In other words, in the image reading optical system 86a, the position of the lead registration is corrected by the planar mirror which does not affect the focusing position after the focusing position is adjusted by the adjustment mirror.

Meanwhile, the adjustment of the position of the lead registration according to the exemplary embodiment may be performed by any one of the movement and rotation of the mirror 90 and may be performed by both of them. In addition, the position of the planar mirror which adjusts the lead registration is not limited to the position of the mirror 90, and may be provided in any of the optical path from the original document to the sensor 88. Further, the adjustment of the lead registration does not necessarily have to be performed by one planar mirror, and, instead, plural planar mirrors may be combined and used for the adjustment of the lead registration.

In the image reading optical system according to the exemplary embodiment, the adjustment of the focusing position including the adjustment of the position of the lead registration is further simplified.

[Third Exemplary Embodiment]

An image reading optical system 300 according to a third exemplary embodiment will be described with reference to FIGS. 6 to 8I. In the exemplary embodiment, the image-forming mirror on the original-document side is set to the adjustment mirror or the adjusting unit. In the exemplary embodiment, results of simulation of the adjustment characteristics of the adjustment of the focusing position are described by variously changing the position and the adjustment direction of the adjustment mirror or the adjusting unit.

Figure 6:
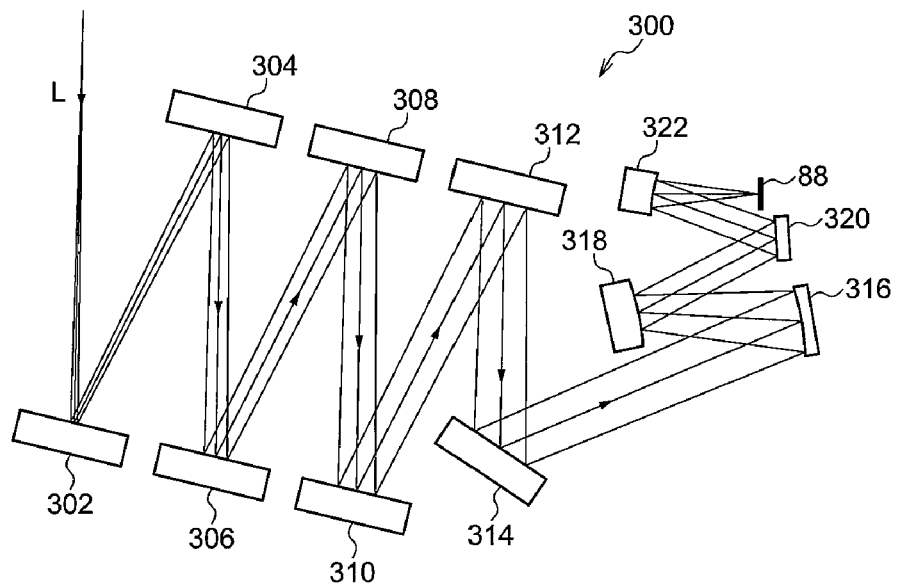
FIG. 6 is a side view illustrating an example of the configuration of an image reading optical system according to a third exemplary embodiment and a fourth exemplary embodiment.

As illustrated in FIG. 6, the image reading optical system 300 includes mirrors 302, 304, 306, 308, 310, 312, and 314, image-forming mirrors 316, 318, 320, and 322, and the sensor 88. In the exemplary embodiment, each of the mirrors 302, 304, 306, 308, 310, 312, and 314 is set to a planar mirror. As above, the image reading optical system 300 has a form in which the number of turns of the light flux of the reflected light L is increased using a larger number of mirrors and the length of the optical path is increased compared to the above-described exemplary embodiment. Meanwhile, in the exemplary embodiment, a case in which each of the mirrors 302, 304, 306, 308, 310, 312, and 314 is set to the planar mirror will be described as an example. However, the exemplary embodiment is not limited thereto, and the image-forming mirrors may have power (positive or negative) in the longitudinal direction or the lateral direction, or both of the directions.

The characteristics of the adjustment of the focusing position in a case in which the image-forming mirror on the original-document side is set to the adjustment mirror or the adjusting unit will be described with reference to FIGS. 7A to 8I.

<Adjustment Method 1>

Figure 7A:
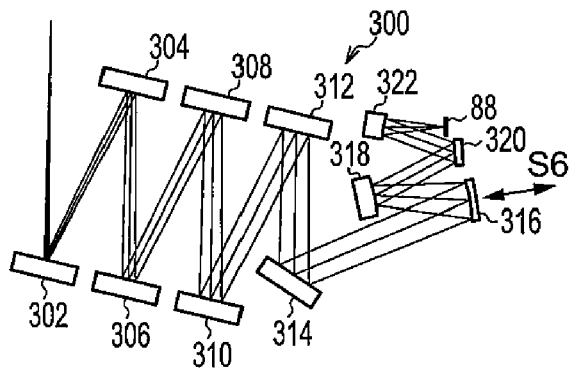
FIGS. 7A to 7I are parts of a graph illustrating adjustment characteristics in a case in which the position of the adjustment mirror or an adjusting unit of the image reading optical system according to the third exemplary embodiment is changed.
Figure 7B:
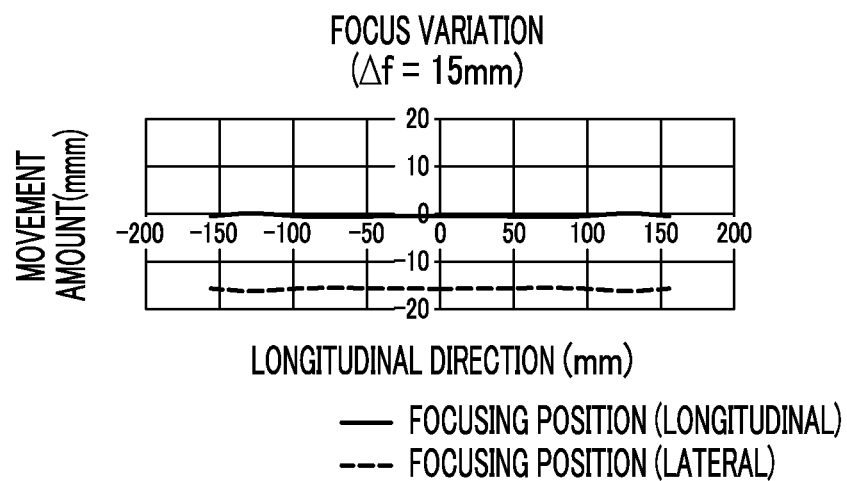
Figure 7C:
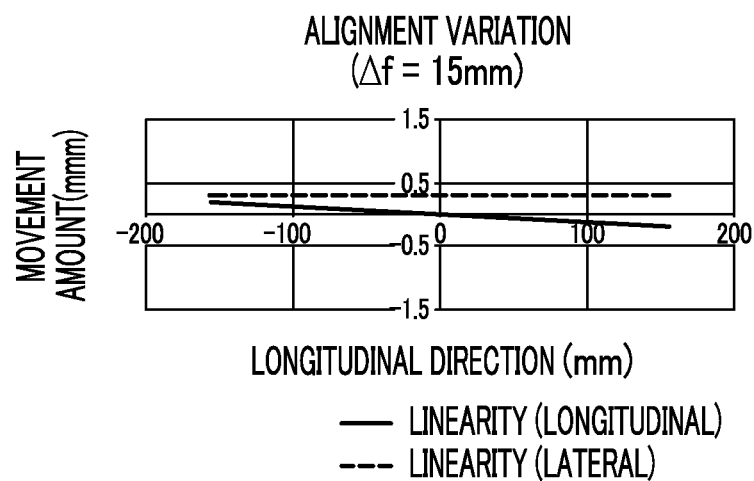

FIG. 7A illustrates a configuration of an adjustment method 1 in which the image-forming mirror 316 is set to an adjustment mirror, which has power only in the lateral direction, and is enabled to move along a movement direction S6, that is, an intermediate direction between the direction of light which is incident into the image-forming mirror 316 and the direction of the reflected light. FIG. 7B is a graph illustrating the relationship between the focus variation in the longitudinal direction and the position in the longitudinal direction and the relationship between the focus variation in the lateral direction and the position in the longitudinal direction, respectively, in a case in which the lateral focus of the image-forming mirror 316 is moved by a movement amount Δf of 15 mm from an initial position. FIG. 7C is a graph illustrating the relationship between the alignment variation in the longitudinal direction and the position in the longitudinal direction and the relationship between the alignment variation in the lateral direction and the position in the longitudinal direction, respectively, in a case in which the lateral focus of the image-forming mirror 316 is moved by a movement amount Δf of 15 mm from the initial position. Since the meaning of the graph is the same as that described above with reference to FIGS. 12A and 12B, the detailed description thereof will not be repeated.

<Adjustment Method 2>

Figure 7D:
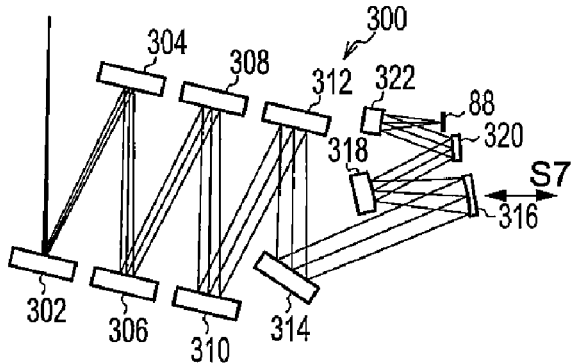
Figure 7E:
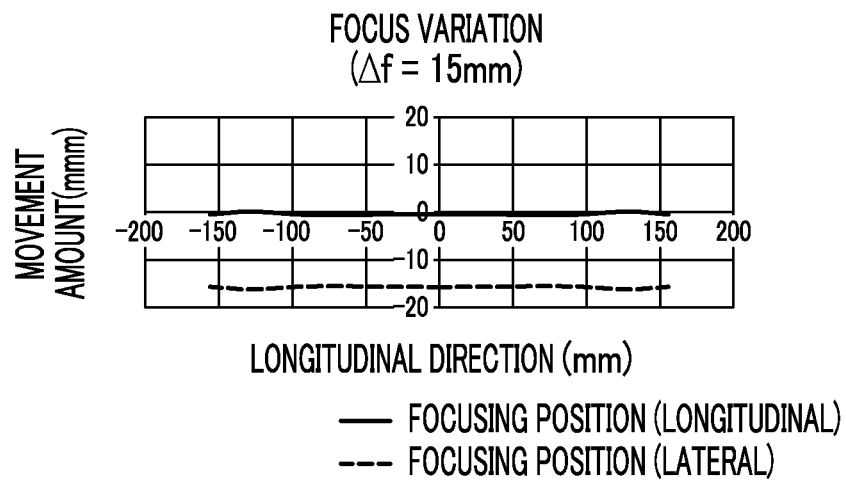
Figure 7F:
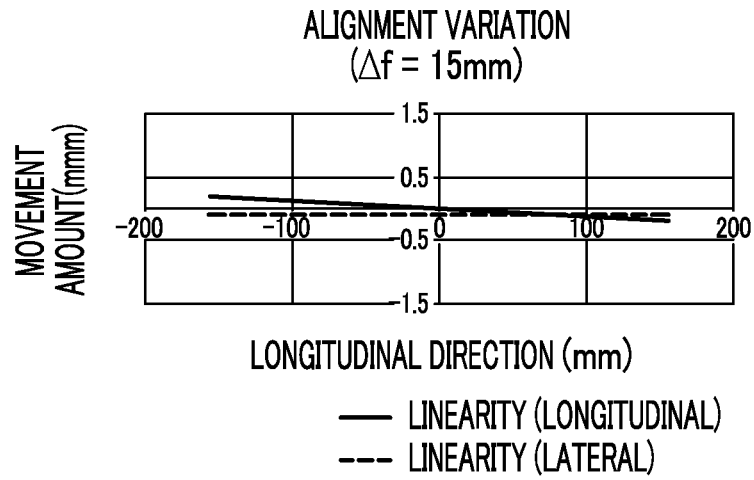

Similarly, FIG. 7D is a configuration diagram illustrating an adjustment method 2 in which the image-forming mirror 316 is set to an adjustment mirror which has power only in the lateral direction and is enabled to move along a movement direction S7, that is, a direction of light which is incident into the sensor 88. FIG. 7E illustrates the focus variation and FIG. 7F illustrates the alignment variation, respectively, in that case.

<Adjustment Method 3>

Figure 7G:
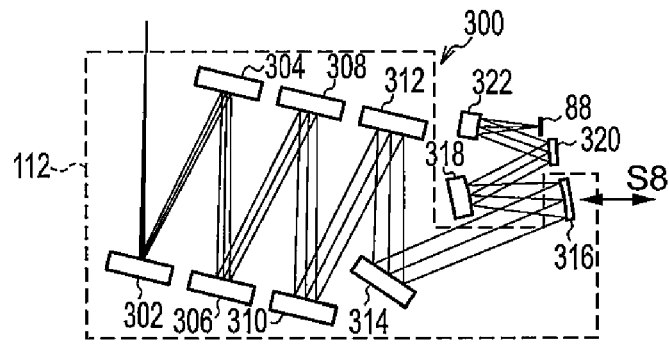
Figure 7H:
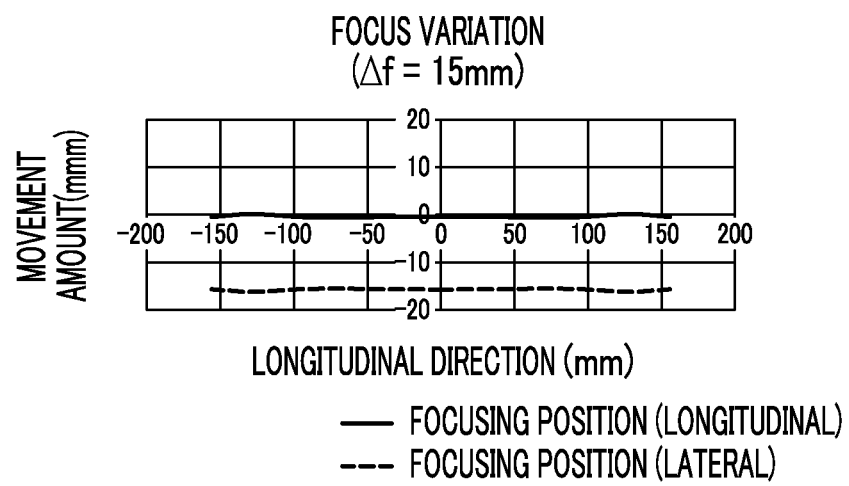
Figure 7I:
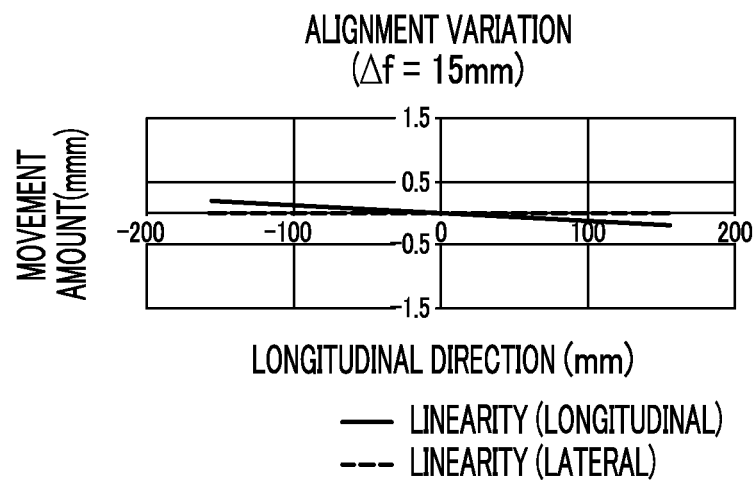

FIG. 7G is a configuration diagram illustrating an adjustment method 3 in which a movement unit 112 is formed by the mirrors 302 to 314 and the image-forming mirror 316 which has power only in the lateral direction and the movement unit 112 is enabled to integrally move along a movement direction S8, that is, a direction of light which is incident into the sensor 88. FIG. 7H illustrates the focus variation and FIG. 7I illustrates the alignment variation, respectively, in that case. Meanwhile, in the adjustment method, the adjustment method in which the movement unit is formed by the mirrors 302 to 314 and the image-forming mirror 316 is described as an example. However, other configurations, that is, an adjustment method in which the image-forming mirrors 318, 320, and 322 are set to the movement unit and are integrally moved may be provided.

<Adjustment Method 4>

Figure 8A:
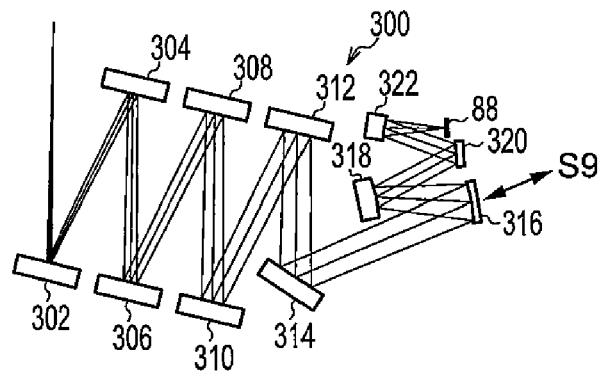
FIGS. 8A to 8I are parts of graphs illustrating adjustment characteristics in a case in which the position of the adjustment mirror or the adjusting unit of the image reading optical system according to the third exemplary embodiment is changed.
Figure 8B:
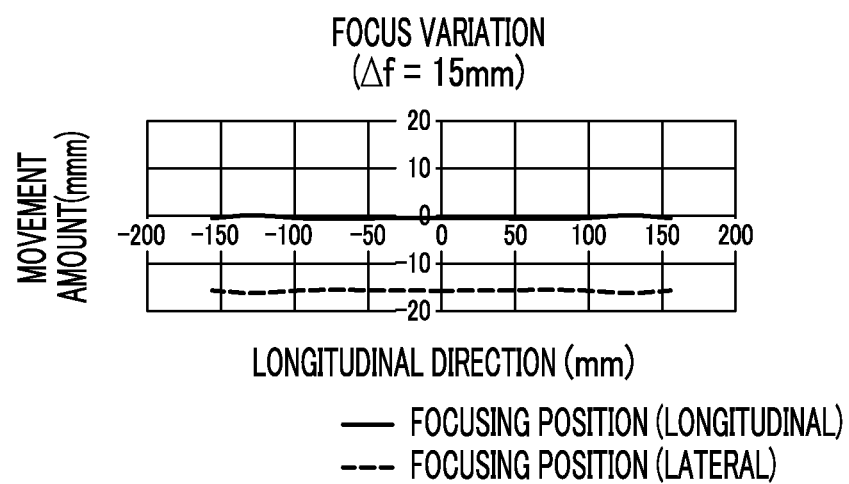
Figure 8C:
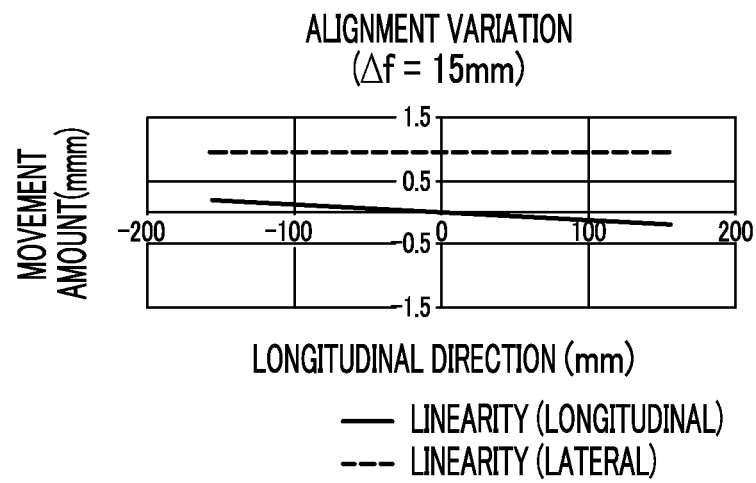

FIG. 8A is a configuration diagram illustrating an adjustment method 4 in which the image-forming mirror 316 is set to the adjustment mirror which has power only in the lateral direction and is enabled to move along a movement direction S9, that is, a direction of light which is incident into the image-forming mirror 316. FIG. 8B illustrates the focus variation and FIG. 8C illustrates the alignment variation, respectively, in that case.

<Adjustment Method 5>

Figure 8D:
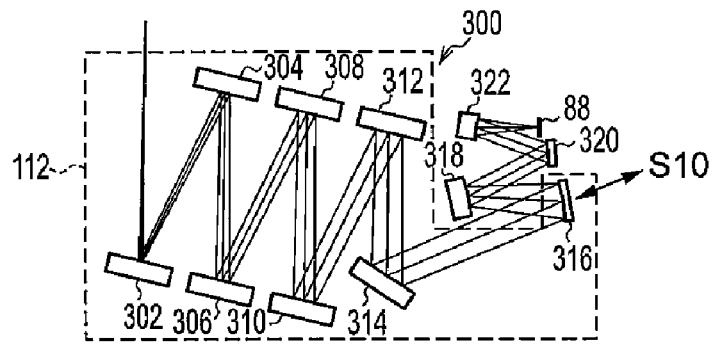
Figure 8E:
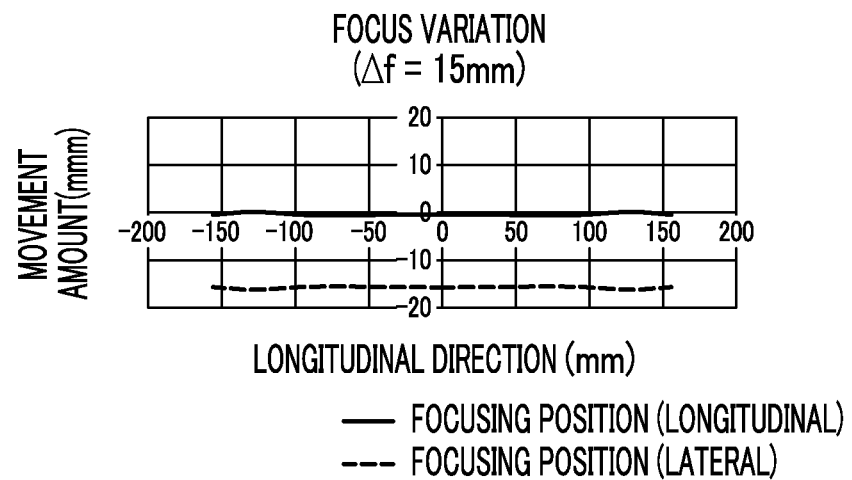

FIG. 8D is a configuration diagram illustrating an adjustment method 5 in which the movement unit 112 is enabled to integrally move along a movement direction S10, that is, a direction of light which is incident into the image-forming mirror 316. FIG. 8E illustrates the focus variation and FIG. 8F illustrates the alignment variation, respectively, in that case.

<Adjustment Method 6>

Figure 8F:
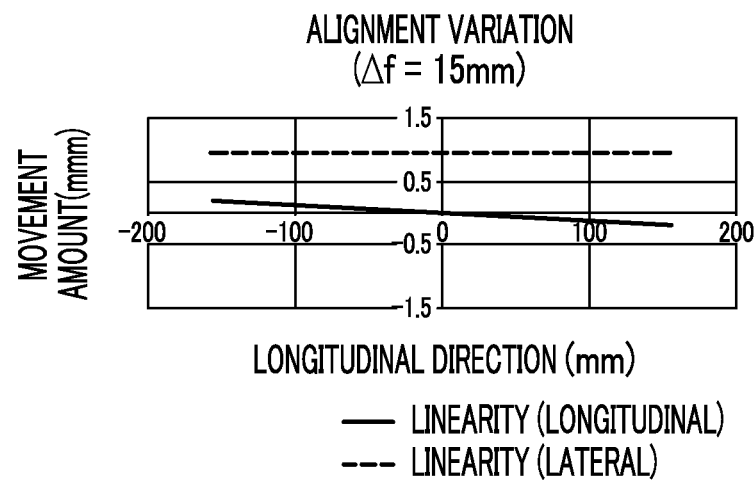
Figure 8G:
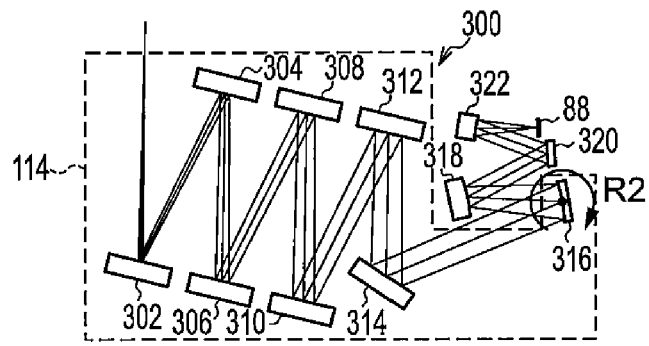
Figure 8H:
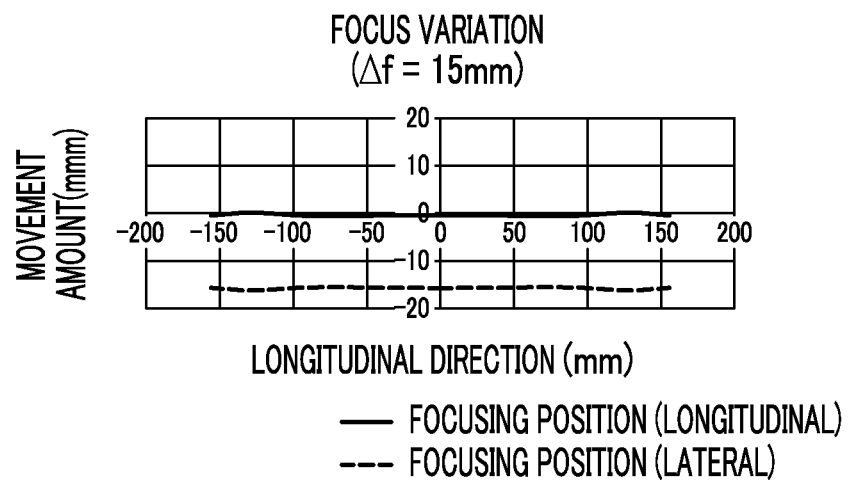

FIG. 8G is a configuration diagram illustrating an adjustment method 6 in which a rotation unit 114 is formed by the mirrors 302 to 314 and the image-forming mirror 316 which has power only in the lateral direction, and the rotation unit 114 is enabled to integrally rotate along a rotation direction R2, that is, a rotation direction in which the center of the image-forming mirror 316 is set to a rotation axis. FIG. 8H illustrates the focus variation and FIG. 8I illustrates the alignment variation, respectively, in that case.

Figure 8I:
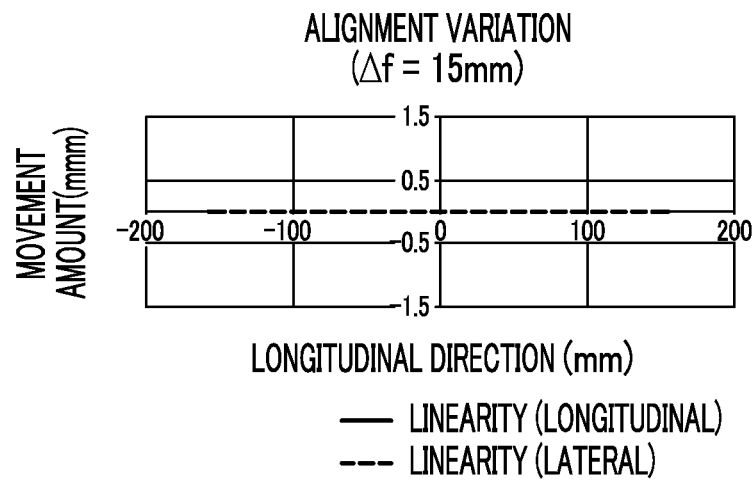

As being apparent in a case in which FIGS. 7C, 7F, and 7I are compared with FIGS. 8C, 8F, and 8I, it is understood that it is preferable that the alignment variations in the adjustment method 2, the adjustment method 3, and the adjustment method 6 are small, and, in particular, the adjustment method 3 and the adjustment method 6 are preferable. The content of each of the preferable adjustment methods will be described again below.

<ADJUSTMENT METHOD 2> Adjustment method in which the image-forming mirror (image-forming mirror 316) on the original-document side is set to the adjustment mirror and the adjustment mirror is moved along a direction of light which is incident into the sensor.

<ADJUSTMENT METHOD 3> Adjustment method in which the movement unit (movement unit 112) that includes the image-forming mirror (image-forming mirror 316) on the original-document side is set to the adjusting unit and the adjusting unit is moved along a direction of light which is incident into the sensor.

<ADJUSTMENT METHOD 6> Adjustment method in which the rotation unit (rotation unit 114) that includes the image-forming mirror (image-forming mirror 316) on the original-document side is set to the adjusting unit and the adjusting unit is rotated while the center of the adjustment mirror is set to a rotation axis.

[Fourth Exemplary Embodiment]

An image reading optical system 300*a* according to a fourth exemplary embodiment will be described with reference to FIGS. 9A to 9I and FIGS. 10A to 10F. The image reading optical system 300*a* has a form in which the image-forming mirror on the sensor side is set to the adjustment mirror or the adjusting unit. In the exemplary embodiment, results of simulation of the adjustment characteristics of the adjustment of the focusing position are described by variously changing the position and the adjustment direction of the adjustment mirror or the adjusting unit. Meanwhile, since the configuration of the mirrors of the image reading optical system 300*a* is the same as that of the image reading optical system 300 illustrated in FIG. 6, the same reference numerals are attached to the same components and the detailed description thereof will not be repeated.

<Adjustment Method 7>

Figure 9A:
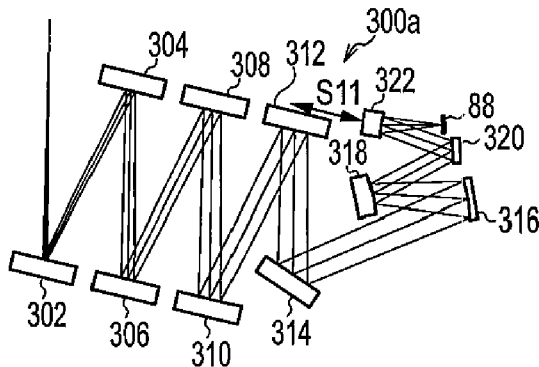
FIGS. 9A to 9I are parts of graphs illustrating adjustment characteristics in a case in which the position of the adjustment mirror or the adjusting unit of the image reading optical system according to the fourth exemplary embodiment is changed.
Figure 9B:
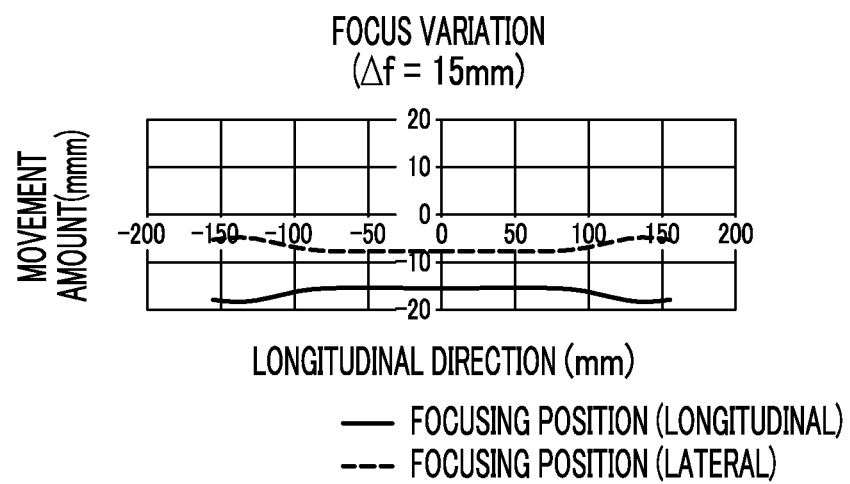
Figure 9C:
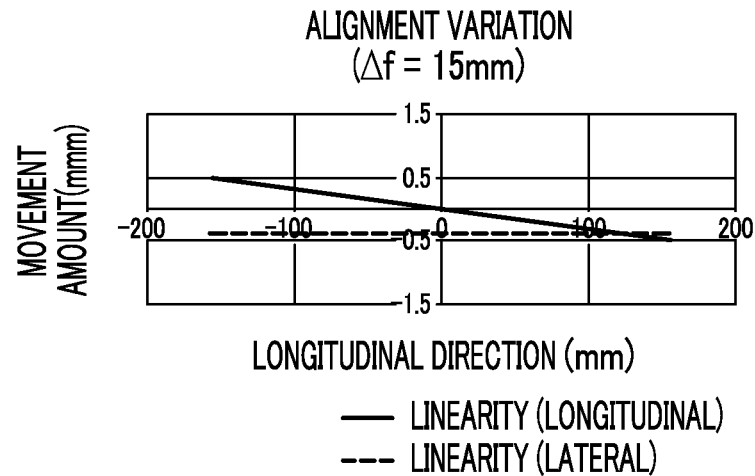

FIG. 9A illustrates the configuration of an adjustment method 7 in which the image-forming mirror 322 is set to the adjustment mirror which has power only in the lateral direction and is enabled to move along a movement direction S11, that is, an intermediate direction between the direction of light which is incident into the image-forming mirror 322 and the direction of the reflected light. FIG. 9B is a graph illustrating the relationship between the focus variation in the longitudinal direction and the position in the longitudinal direction and the relationship between the focus variation in the lateral direction and the position in the longitudinal direction, respectively, in a case in which the lateral focus of the image-forming mirror 322 is moved by a movement amount Δf of 15 mm from an initial position. FIG. 9C is a graph illustrating the relationship between the alignment variation in the longitudinal direction and the position in the longitudinal direction and the relationship between the alignment variation in the lateral direction and the position in the longitudinal direction, respectively, in a case in which the lateral focus of the image-forming mirror 316 is moved by a movement amount Δf of 15 mm from the initial position. Since the meaning of the graph is the same as that described above with reference to FIGS. 12A and 12B, the detailed description thereof will not be repeated.

<Adjustment Method 8>

Figure 9D:
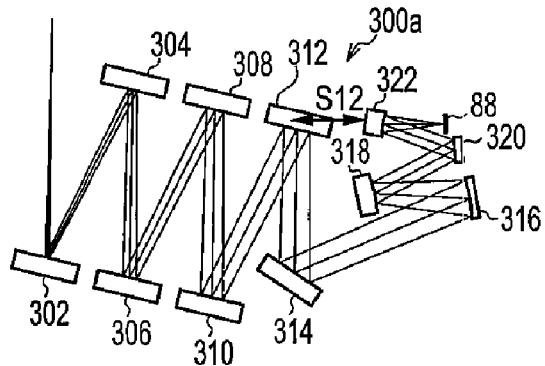
Figure 9E:
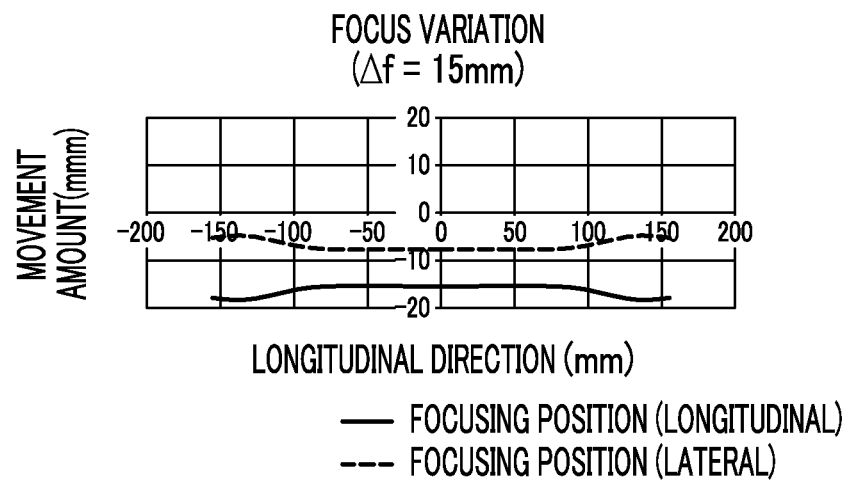
Figure 9F:
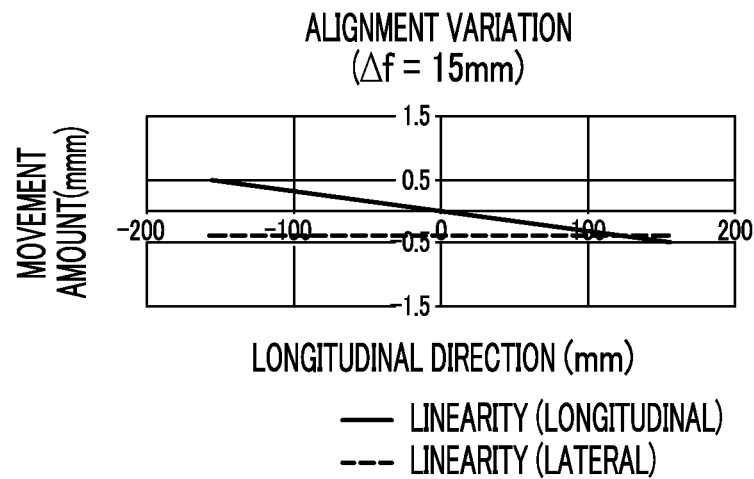

Similarly, FIG. 9D is a configuration diagram illustrating an adjustment method 8 in which the image-forming mirror 322 is set to an adjustment mirror which has power only in the lateral direction and is enabled to move along a movement direction S12, that is, a direction of light which is incident into the sensor 88. FIG. 9E illustrates the focus variation and FIG. 9F illustrates the alignment variation, respectively, in that case.

<Adjustment Method 9>

Figure 9G:
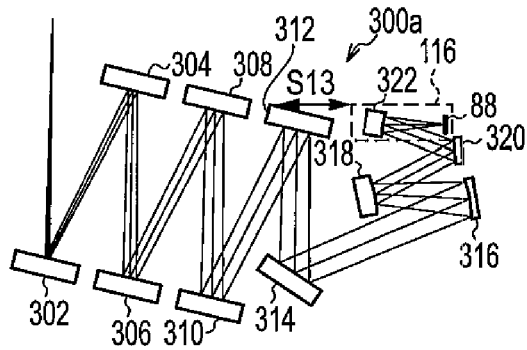
Figure 9H:
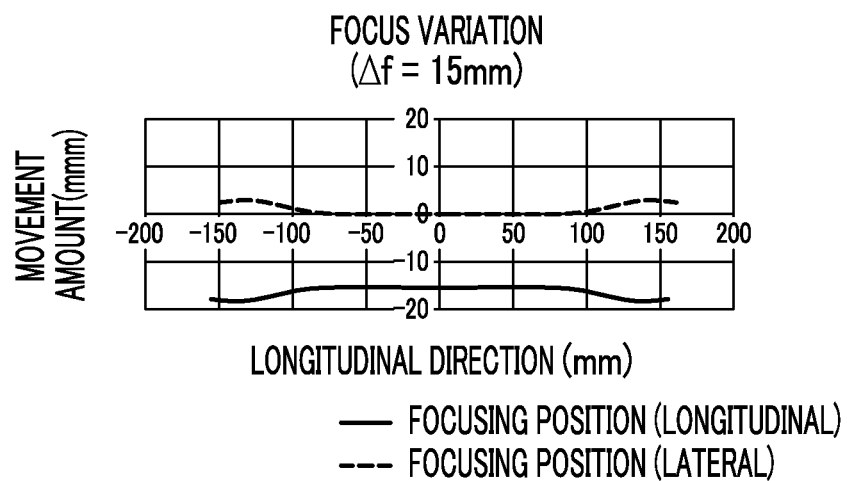
Figure 9I:
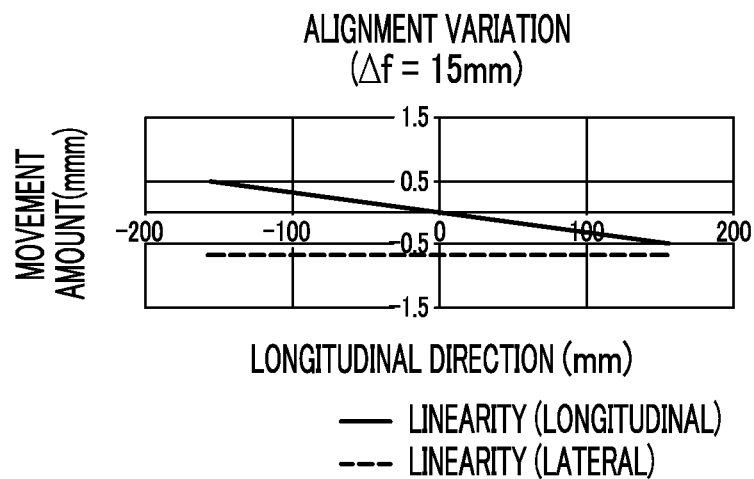

FIG. 9G is a configuration diagram illustrating an adjustment method 9 in which a movement unit 116 is formed by the image-forming mirror 322 that has power only in the lateral direction and the sensor 88 and the movement unit 116 is enabled to integrally move along a movement direction S13, that is, a direction of light which is incident into the sensor 88. FIG. 9H illustrates the focus variation and FIG. 9I illustrates the alignment variation, respectively, in that case.

<Adjustment Method 10>

Figure 10A:
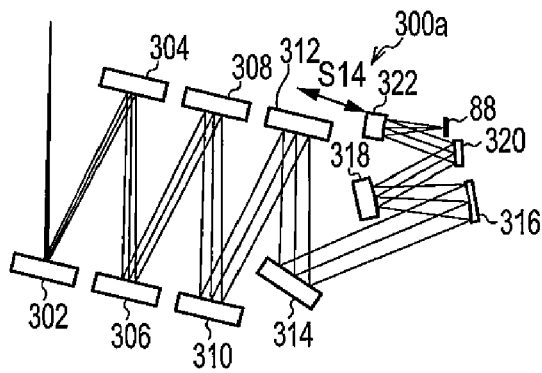
FIGS. 10A to 10F are parts of graphs illustrating adjustment characteristics in a case in which the position of the adjustment mirror or the adjusting unit of the image reading optical system according to the fourth exemplary embodiment is changed.
Figure 10B:
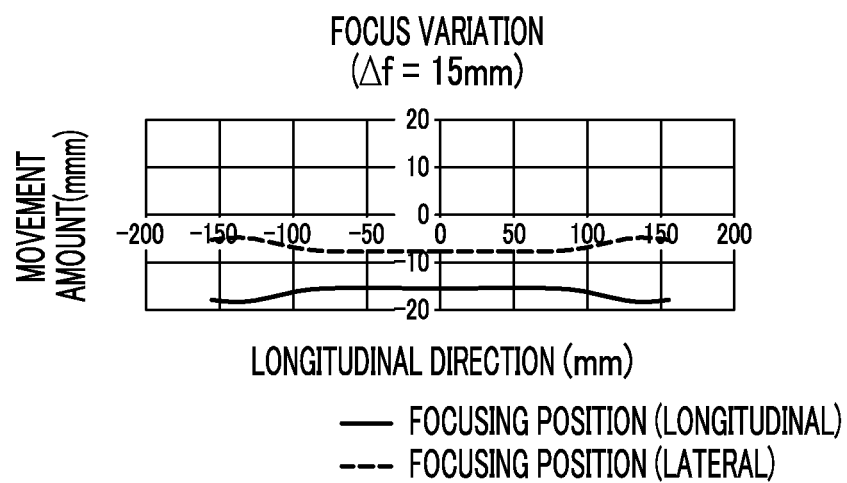
Figure 10C:
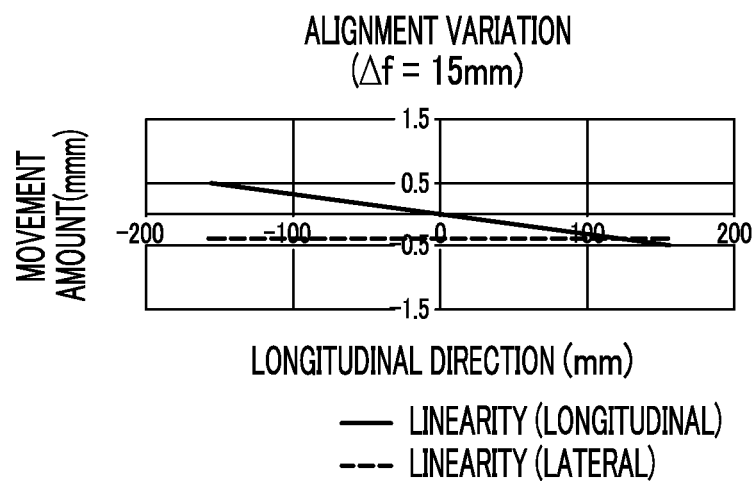

FIG. 10A is a configuration diagram illustrating an adjustment method 10 in which the image-forming mirror 322 is set to the adjustment mirror which has power only in the lateral direction and is enabled to move along a movement direction S14, that is, a direction of light which is incident into the image-forming mirror 322. FIG. 10B illustrates the focus variation and FIG. 10C illustrates the alignment variation, respectively, in that case.

<Adjustment Method 11>

Figure 10D:
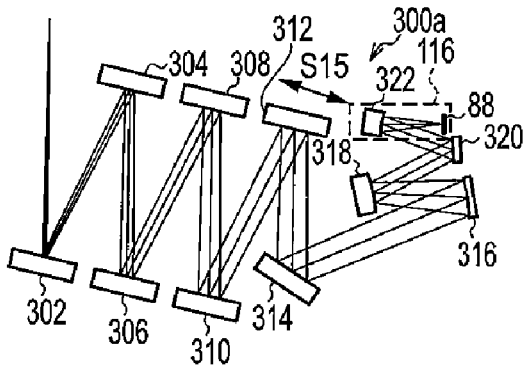
Figure 10E:
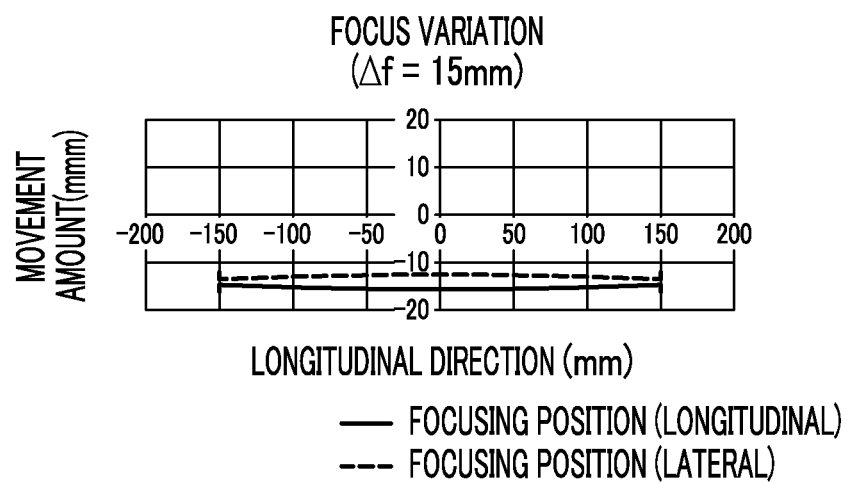
Figure 10F:
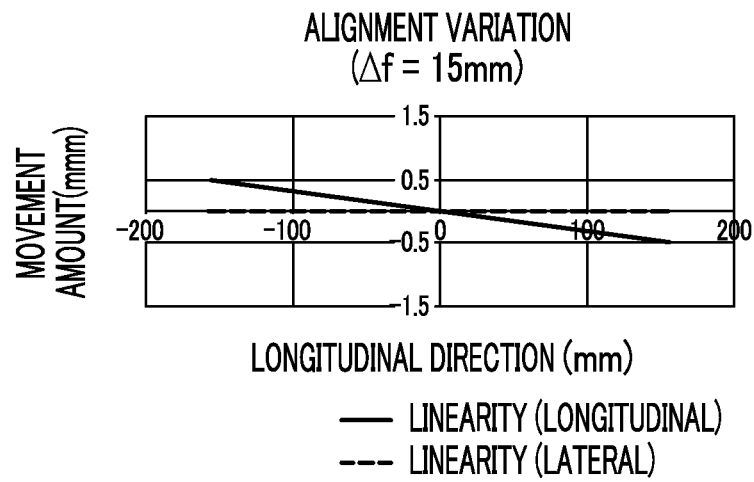

FIG. 10D is a configuration diagram illustrating an adjustment method 11 in which the movement unit 116 is enabled to integrally move along a movement direction S15, that is, a direction of light which is incident into the image-forming mirror 322. FIG. 10E illustrates the focus variation and FIG. 10F illustrates the alignment variation, respectively, in that case.

<Adjustment Method 12>

Although not illustrated in the drawing, an adjustment method 12 is an adjustment method in which the rotation unit is formed by the image-forming mirror 322 which has power only in the lateral direction and the sensor 88, and the rotation unit is enabled to be integrally rotated in the rotation direction in which the center of the image-forming mirror 322 is set to the rotation axis. The characteristics of the focus variation and the alignment variation of the adjustment method are the same as the respective characteristics of the adjustment method 11, that is, the characteristics as illustrated in FIGS. 10E and 10F.

As a result of investigation of the adjustment characteristics of the adjustment methods 7 to 12, it is understood that the adjustment method 9, that is, the adjustment method, in which the movement unit (movement unit 116) that includes the sensor 88 and the image-forming mirror (image-forming mirror 322) on the sensor side is set as the adjusting unit and the adjusting unit is moved along a direction of light which is incident into the sensor, is the most excellent adjustment method because the amount of change in the position of the lateral focus is less in a case in which the position of the longitudinal focus is adjusted.

As described above, if the image-forming mirror on the sensor side is set to the adjustment mirror, the image-forming mirror that is arranged in a position in which the light flux of the reflected light L is reduced is adjusted. Therefore, compared to a case in which the image-forming mirror on the original-document side is adjusted, adjustment is performed using a small image-forming mirror, and thus there is an advantage in which it is easy to perform adjustment.

Meanwhile, in the exemplary embodiment, the configuration which is illustrated in FIGS. 2A and 2B or FIG. 6 has been described as an example of the mirror which forms the image reading optical system. However, the number of mirrors, the direction of power of each of the mirrors (the longitudinal direction or the lateral direction), and the like maybe appropriately set according to the optical path length, the shape of the light flux, or the like which is necessary in the image reading optical system.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading optical system comprising:
an image reading unit in which a plurality of reading devices are arranged in a first direction; and
a plurality of image-forming mirrors that guide reflected light, which is acquired by reflecting light from a light source in a reading target, to the image reading unit, wherein
any one of the plurality of image-forming mirrors is an adjustment mirror that has power only in one of the first direction and a second direction intersecting the first direction, and is rotatable or relatively movable with respect to the other image-forming mirrors,
the adjustment mirror is a first image-forming mirror which is nearest to the reading target or a second image-forming mirror which is nearest to the image reading unit from among the plurality of image-forming mirrors,
the adjustment mirror is the first image-forming mirror, and
the plurality of mirrors are further included between the reading target and the adjustment mirror so that the adjustment mirror and the plurality of mirrors are integrally movable as a movement unit.

2. The image reading optical system according to claim 1, wherein the movement unit is movable along an optical axis of light which is incident into the image reading unit.

3. An image reading optical system comprising:
an image reading unit in which a plurality of reading devices are arranged in a first direction; and
a plurality of image-forming mirrors that guide reflected light, which is acquired by reflecting light from a light source in a reading target, to the image reading unit, wherein
any one of the plurality of image-forming mirrors is an adjustment mirror that has power only in one of the first direction and a second direction intersecting the first direction, and is rotatable or relatively movable with respect to the other image-forming mirrors,
the adjustment mirror is a first image-forming mirror which is nearest to the reading target or a second image-forming mirror which is nearest to the image reading unit from among the plurality of image-forming mirrors,
the adjustment mirror is the first image-forming mirror, and
the plurality of mirrors are further included between the reading target and the adjustment mirror so that the adjustment mirror and the plurality of mirrors are integrally rotatable as a rotation unit around a center of the adjustment mirror as an axis.

4. An image reading optical system comprising:
an image reading unit in which a plurality of reading devices are arranged in a first direction; and
a plurality of image-forming mirrors that guide reflected light, which is acquired by reflecting light from a light source in a reading target, to the image reading unit, wherein
any one of the plurality of image-forming mirrors is an adjustment mirror that has power only in one of the first direction and a second direction intersecting the first direction, and is rotatable or relatively movable with respect to the other image-forming mirrors,
the adjustment mirror is a first image-forming mirror which is nearest to the reading target or a second image-forming mirror which is nearest to the image reading unit from among the plurality of image-forming mirrors,
the adjustment mirror is the second image-forming mirror, and
the adjustment mirror and the image reading unit are integrally movable as a movement unit.

5. The image reading optical system according to claim 4, wherein the movement unit is movable along an optical axis of light which is incident into the image reading unit.

* * * * *